United States Patent [19]

Riess et al.

[11] Patent Number: 5,262,455

[45] Date of Patent: Nov. 16, 1993

[54] PROCESS FOR AGGLOMERATING A LATEX, AGGLOMERATED LATEX OBTAINED AND ITS APPLICATION OF THE MODIFICATION OF THERMOPLASTIC MATRICES TO MAKE THEM IMPACT-RESISTANT

[75] Inventors: Gerard Riess, Mulhouse; Herve Thyebault, Grande Bretagne, both of France

[73] Assignee: Societe Chimique des Charbonnages, S.A., Cedex, France

[21] Appl. No.: 845,135

[22] Filed: Mar. 3, 1992

Related U.S. Application Data

[60] Division of Ser. No. 595,674, Oct. 11, 1990, which is a continuation of Ser. No. 163,752, Feb. 12, 1988, abandoned.

[30] Foreign Application Priority Data

Jun. 13, 1986 [FR] France .................................. 86 08556

[51] Int. Cl.$^5$ ................................................ C08L 9/08
[52] U.S. Cl. .................................... 523/335; 524/501; 524/505; 528/494
[58] Field of Search ............... 523/335; 524/501, 505; 528/494

[56] References Cited

U.S. PATENT DOCUMENTS 2,947,715  8/1960  Charlet et al. ...................... 523/335
3,551,370  12/1970  Dalton ................................. 523/335
3,558,541  1/1971  Dalton ................................. 523/335
4,357,270  11/1982  Pippa et al. ......................... 523/335

FOREIGN PATENT DOCUMENTS 215788A  11/1984  German Democratic Rep. ................................ 523/335

*Primary Examiner*—Paul R. Michl
*Assistant Examiner*—John J. Guarriello
*Attorney, Agent, or Firm*—Finnegan, Henderson, Farabow, Garrett & Dunner

[57] ABSTRACT

The agglomeration of a latex of a polymer chosen from elastomers and thermoplastic resins is performed by mixing the latex to be agglomerated with an agglomerating latex consisting of:

(A) a polymer chosen from elastomers and thermoplastic resins; and
(B) a nonionic surface-active agent consisting of a block polymer containing at least one polyoxyethylene block and at least one block of a polymer chosen from vinyl, diene and acrylic and methacrylic ester polymers, the said agglomerating latex being produced by the synthesis of the polymer defined under (A) during which (B) has been employed as a surfactant. The polyoxyethylene-polystyrene-polyoxyethylene triblock polymer may be mentioned among the surface-active agents (B).

17 Claims, No Drawings

PROCESS FOR AGGLOMERATING A LATEX, AGGLOMERATED LATEX OBTAINED AND ITS APPLICATION OF THE MODIFICATION OF THERMOPLASTIC MATRICES TO MAKE THEM IMPACT-RESISTANT

This is a division of application Ser. No. 07/595,674, filed Oct. 11, 1990, which was a continuation of application Ser. No. 07/163,752 filed Feb. 12, 1988.

The present invention relates to a process for agglomerating a latex based on a polymer chosen from elastomers and thermoplastic resins, the latex obtained by this process, and its application to the modification of rigid thermoplastic matrices to make them impact-resistant. By way of examples, there may be mentioned the application of a polybutadiene-based latex to the preparation of acrylonitrile-butadiene-styrene (ABS) resins, or the application of multilayer acrylic latices or of SBR latices in the reinforcement of matrices based on methyl methacrylate and styrene, or, yet again, the application of multilayer acrylic latices in the reinforcement of polystyrene matrices.

It is known that latices consist of emulsions of polymers in water to which various agents have been added, such as emulsifying agents, stabilizers and the like, and that in most cases they are produced directly by emulsion polymerization. The purpose of the agglomeration process is to increase the size of the polymer particles in these emulsions.

For example, if the reaction rate of the monomers is low then, in order to avoid a waste of energy and time, particularly in the case of manufacture on industrial scale, it is advantageous to employ high polymerization rates which lead to small particle sizes, below 200 nm, and then to perform an agglomeration of these particles of intermediate size, enabling them to attain the size finally required.

Thus, to produce an ABS resin with good impact strength characteristics, it is necessary to have available a polybutadiene-based latex in which the particle sizes lie between 300 and 700 nm. Now, with the usual method of emulsion polymerization of butadiene, the particle sizes increase at a rate of only 10 nm per hour, with the result that the polymerization is carried out so as to produce latices in which the polymer particles are small in size (of the order of 80-200 nm), in order to subsequently make use of an agglomeration technique.

The principle of all the known techniques for agglomerating latices is the transition from a stable state in which the latex contains fine polymer particles to another stable state in which the latex contains large polymer particles, under the effect of a physical, chemical or physicochemical agent, it being possible for the final stable state to be ensured, if desired, by a poststabilization of the latex.

The agglomeration methods proposed in the literature may be subdivided into two categories according to whether they do not employ a chemical agent or whether, on the contrary, they do employ one.

The first of these, among which the cooling method and the pressure gradient method may be mentioned, have the advantage of not contaminating the latices and, consequently, not interfering with subsequent processing of the latter (for example, grafting in the case where ABS is produced from a polybutadiene latex) and with the properties of the resulting products.

The second methods employ, as chemical agents, either solvents such as benzene, toluene, acetone and mixtures of the benzene-alcohol type, because of their destabilizing and swelling action, or else electrolytes, salts or acids, which act by partial destruction of the emulsifier protection, or, yet again, hydrophilic polymers: polyvinyl alcohol, polyvinyl methyl ether, polyoxyethylene, acrylic polyelectrolytes, polyurethanes, polyethylene glycol (Carbamax 20M), carboxymethyl cellulose and polyvinylacetal.

However, all these known methods present the following disadvantages:
- a high energy consumption;
- a more or less pronounced formation of coagulum;
- a limited and rather small size of the agglomerated particles;
- a high dependence of agglomeration with relation to temperature and time; and
- the difficulty of controlling and the difficulty of reproducing the size distribution of the agglomerated particles.

To overcome these disadvantages, European Patent No. 29,613 has already proposed a process for the agglomeration of latices based on rubbery polymers, this process consisting of adding to the latex to be agglomerated another latex (called an agglomerating latex) containing:

(1) a polymer other than that present in the latex to be agglomerated and less lipophilic than the latter, chosen from (a) the homopolymers of $C_1$-$C_{12}$-alkyl acrylates and methacrylates; and (b) the copolymers of ethylenically unsaturated monomers capable of forming water-insoluble homopolymers, and (2) a nonionic surface-active agent consisting of a product of addition of ethylene oxide to organic compounds containing reactive hydrogen atoms in their molecules.

However, this known process has a number of disadvantages and limitations.

Firstly, it may be emphasized that since, in this known process, the polymer in the latex to be agglomerated must be other than that of the agglomerating latex, and since the principal latex to be agglomerated is polybutadiene, it is not possible to employ a polybutadiene latex as an agglomerating latex.

Secondly, the synthesis of the latex which agglomerates by adsorption of the agglomerating surfactant on the initial latex involves the presence of the anionic surfactant in the latter, which reduces the size of the agglomerated latex and can lead to a preagglomeration, or even to incipient precipitation of the agglomerating latex.

Thirdly, a bimodal population is invariably obtained in this known process.

The present inventors have found, surprisingly, that when the abovementioned surface-active agent (2) in the agglomerating latex was replaced by a copolymer containing at least one polyoxyethylene block and at least one block of a vinyl, diene, acrylic and methacrylic ester polymer, this multiblock polymer being, furthermore, that in whose presence the preparation of the agglomerating latex is carried out, then it was possible to avoid the disadvantages of the known process, namely:

on the one hand, that the polymers in the latex to be agglomerated and in the agglomerating latex can be identical and that, generally, the group of the polymers to be agglomerated can be widened to the thermoplastic polymers without this making it necessary to perform the agglomeration at a temperature above the glass transition temperature of the polymer to be agglomerated, as is the case with the process described in European Patent No. 29,613, which is also limited to the use of rubbery polymers to be agglomerated;

on the other hand, that it is readily possible to produce agglomerated particles of large size; and lastly, that a monomodal or bimodal population may be obtained at will, according to the value of the ratio of the mass of agglomerating polymer in 100 g of final latex to the mass of the polymer to be agglomerated in 100 g of final latex, and this forms a completely unexpected feature of the present invention.

In addition, the use of the abovementioned multiblock copolymer offers the additional advantages of making it possible to perform the agglomeration in a wide range of temperatures and in a wide range of solids contents of the agglomerating latex and of the latex to be agglomerated (it is possible, in particular, to work at much lower values of solids contents in the agglomerating latex than in the known process); and to attain a percentage of agglomerated particles of 100%.

The subject of the present invention is therefore a process for agglomerating a latex of a polymer chosen from elastomers and thermoplastic resins, characterized in that the latex to be agglomerated is mixed with an agglomerating latex consisting of:

(A) a polymer chosen from elastomers and thermoplastic resins; and (B) a nonionic surface-active agent consisting of a block polymer containing at least one polyoxyethylene block and at least one block of a polymer chosen from vinyl, diene and acrylic and methacrylic ester polymers, the said agglomerating latex being produced by the synthesis of the polymer defined under (A) during which (B) has been employed as surfactant.

Among the polymers of the latices to be agglomerated and the agglomerating latices, particular mention will be made of homopolymers and copolymers of butadiene, isoprene, styrene, alpha-methylstyrene, vinyltoluenes, acrylonitrile, and alkyl esters of acrylic, methacrylic, maleic, fumaric, crotonic and itaconic acids, in which the alkyl group contains from 1 to 12 carbon atoms, it being also possible for the latices to be agglomerated to be SBR latices or multilayer (bi- or trilayer) acrylic latices of a structure known as "core-shell".

A nonionic surface-active agent (B) consisting of a triblock polymer, preferably a polymer containing two terminal polyoxyethylene blocks, will preferably be chosen. A nonionic surface-active agent (B) consisting of a diblock polymer may equally be employed.

Furthermore, a polymer in which the block(s) other than the polyoxyethylene block(s) consists (or consist) of polystyrene will be chosen in particular. Thus, there may be mentioned the surfactant B which consists of the polyoxyethylene-polystyrene-polyoxyethylene triblock copolymer, referred to hereinafter as POE-PS-POE.

In addition, the surfactant (B) will advantageously have the following characteristics:

a number average molecular mass of between 1000 and 1,000,000; and a polyoxyethylene content ranging from 5 to 95% by weight.

The surfactants (B) employed in the process according to the present invention are generally prepared by an anionic route, and this has the advantage of resulting in practically pure products. In the case of the preparation of the POE-PS-POE copolymer, the PS block is initiated by difunctional initiators of the "alpha-methylstyrene tetramers" type in tetrahydrofuran at a temperature of $-80°$ C. The POE block is then polymerized at a temperature of $30°$ C.

In accordance with a preferred embodiment of the present invention, the latex to be agglomerated which is employed is prepared by emulsion polymerization in the presence of an anionic surface-active agent such as potassium laurate and sodium dodecylsulphate (SDS), a free-radical initiator such as potassium persulphate and a chain transfer agent such as tert-dodecyl mercaptan, and at a temperature of the order of $40°$ and $90°$ C. The polymer particle diameter in the latex to be agglomerated is, in particular, between 50 and 300 nm and the solids content of the said latex is between 5 and 50% by weight.

Similarly, use will be made, in particular, of an agglomerating latex in which the particle diameter of the polymer (A) will lie between 60 and 500 nm and which has a solids content of between 1 and 40% by weight.

In accordance with the invention, the agglomerating latices are prepared by emulsion polymerization in the presence of the nonionic surface-active agent (B), which enables them to be obtained directly. The polymerization also takes place in the presence of a free-radical initiator such as potassium persulphate. The presence of a chain transfer agent, such as tert-dodecyl mercaptan, is found to be practically essential; the purpose of this agent is to limit the chain length and it also acts as an initiator in the organic phase. An alcohol, such as methanol, may also be added to the mixture, and this acts as a cosurfactant and produces a marked decrease in the particle size by significantly reducing the interfacial tension between the particles and the solvent; this enables the latex particle size to be adjusted. Another surfactant, such as sodium laurylsulphate, could, furthermore, be employed for the same purpose. The polymerization is carried out batchwise or semicontinuously, at a temperature of the order of $40°$ to $90°$ C. (for example $70°$ C.). The conversion is very high and can reach 100%.

The diameter of the polymer particles in the agglomerating latices is a function of the monomers employed (thus, it appears to be lower for butyl acrylate than for butadiene and styrene), of the concentration of alcohol acting as a cosurfactant (as indicated above) and of the process employed (the semicontinuous process results in much smaller particle sizes than the batch process); furthermore, particle diameter diminishes with rising concentrations of copolymer (B, of cosurfactant alcohol and of initiator; on the other hand, an increase in the particle size is observed when the molecular mass Mn of the copolymer (B) increases.

In order to perform the agglomeration the procedure may be to add the agglomeration latex to the latex to be agglomerated, or to add the latex to be agglomerated to the agglomeration latex. It has been found, in fact, that the mixing method employed to produce the agglomeration has practically no effect on the diameter of the resulting agglomerated particles, except for special cases. In general, in practice it is preferable to follow the first method, because it is easy to add the agglomerating latex (a very small volume, in principle) to the latex to be agglomerated (a very large volume, in principle).

Furthermore, the agglomeration mixing according to the invention is performed for a period of time which, as a general rule, is between one minute and 48 hours; similarly, this mixing is carried out at a temperature which may lie between 10° C. and 100° C.

In accordance with the present invention, the agglomerating latex is introduced in a quantity of at least 0.05 part by weight of the solid polymer (A) and of at least 0.0001 part by weight of the surface-active agent (B) per 100 parts by weight of the polymer present in the latex to be agglomerated. In particular, the agglomerating latex may be introduced in a quantity corresponding to 0.05 –20 parts by weight of the solid polymer (A) and of 0.0001–0.2 part by weight of the surface-active agent (B) per 100 parts by weight of the polymer present in the latex to be agglomerated. It should be emphasized, nevertheless, that the quantities indicated above are not critical at all.

In accordance with a feature of the present invention which is of great interest, it has become apparent that, as a general rule, all the curves representing the size of the agglomerated particles as a function of the value of the ratio of the mass of agglomerating polymer to that of the polymer to be agglomerated in 100 grams of final latex exhibit a maximum, the population obtained being bimodal or monomodal, according to whether R is lower or higher than the value corresponding to this maximum. This represents a finding which is of great interest, when compared with the agglomerations produced in the process described in the abovementioned European Patent 29,613.

The morphology of the agglomerated particles is generally spherical and the surface of these particles is smooth. Moreover, the agglomerated particles obtained are stable thermally (freezing-thawing cycle), to ultrasound, to postaddition of agglomerating latex and to shear stresses.

It has thus been possible to produce agglomerated particles which have a size of up to 1700 nm.

The present invention also relates to the agglomerated latices produced by the process just defined and to the application of these agglomerated latices to the modification of thermoplastic matrices to make them impact-resistant. These matrices consist, in particular, of rigid thermoplastic polymers of at least one monomer chosen from alkyl methacrylates in which the alkyl group contains from 1 to 4 carbon atoms, styrene, substituted styrenes, acrylonitrile and methacrylonitrile, or of polymers with more than 50% by weight of at least one of the abovementioned monomers and at least one other ethylenically monounsaturated copolymerizable monomer. Examples of application have been mentioned in the introduction to this specification. The methods for preparing these reinforced matrices are traditional methods, which are known to the specialist. In general, the agglomerated particles are subjected to a coating process before flocculation, washing and drying, the final stage being dispersion in the matrix.

Various agglomerations of latices, which have been performed using the process according to the present invention will be described below in greater detail, by way of guidance and without implying any limitation. The latices employed in these examples have been designated by LPB, LS, LPBA and LSBR in the case of latices to be agglomerated of polybutadiene, polystyrene, poly(butyl acrylate) and of butadiene-styrene copolymer respectively, and by LPBCop, LPSCop, LPBACop and LPBA-SCop, in the case of the agglomerating latices of polybutadiene, polystyrene, poly(butyl acrylate) and butyl acrylate-styrene copolymer respectively, Cop denoting the triblock POE-PS-POE copolymer which is the nonionic surfactant in the presence of which the preparation of the agglomerating latex took place. The percentages indicated in the examples which follow are given by weight.

I—PREPARATION OF THE LATICES TO BE AGGLOMERATED

1) Preparation of Polybutadiene Latex

The following are introduced in succession into an 8-l reactor, after the stirring has been started up gradually to run at 500 revolutions/minute: 500 g of water, 6.3 g of lauric acid dissolved beforehand in 200 g of water, 1.75 g of potassium hydroxide, 2.10 g of tertdodecyl mercaptan (TDM), 1.40 g of potassium hydroxide dissolved in 50 g of water, and a rinse of 5000 g of water. The whole reactor is deoxygenated by being subjected to vacuum and then by the introduction of nitrogen at a pressure of 3 bars. It is heated to 70° C. 2.8 g of potassium persulphate, dissolved beforehand in 100 g of water, are added through an airlock and under nitrogen pressure, followed by a rinse with 50 g of water.

The polybutadiene latices LPB1 to LPB6, whose characteristics are given in Table 2 below, were successfully prepared in this manner, while the pressure was varied.

2) Pressure of the Other Latices to be Agglomerated a) General Operating Procedure Water, the surfactant and sodium hydroxide are employed at a constant temperature of 70° C., with stirring and under a nitrogen stream. After the surfactant has completely dissolved, the mixture of monomer and TDM is added. After 10 min, when the temperature has become steady again, potassium persulphate, dissolved beforehand in water, is added.

b) Preparation of Polystyrene and Poly(butyl acrylate) Latices

The above general operating procedure was followed in order to prepare the individual latices as shown in Table 1 below, the characteristics of these latices also being given in Table 2 below.

TABLE 1

| Latex to be agglomerated prepared | Monomer mass introduced (g) | Surfactant Type | Mass introduced (g) | $K_2S_2O_8$ mass introduced (g) | Potassium hydroxide mass introduced (g) | TDM mass introduced (g) |
|---|---|---|---|---|---|---|
| LPS | 100 | lauric acid | 3.03 | 0.40 | 0.85 | 0.3 |
| LPBA 1 | 100 | lauric acid | 0.80 | 0.40 | 0.80 | 0.3 |

TABLE 1-continued

| Latex to be agglomerated prepared | Monomer mass introduced (g) | Surfactant Type | Surfactant Mass introduced (g) | $K_2S_2O_8$ mass introduced (g) | Potassium hydroxide mass introduced (g) | TDM mass introduced (g) |
| --- | --- | --- | --- | --- | --- | --- |
| LPBA 2 | 160 | SDS | 4.85 | 0.39 | 0 | 0.4 |

3) Characteristics of the Latices to be Agglomerated Prepared According to 1) and 2)

TABLE 2

| Type of latex to be agglomerated | Mean ⌀ (nm) | Standard deviation (nm) | Solids content (%) | Surface tension (newton/cm) |
| --- | --- | --- | --- | --- |
| LPB1* | 203 | 51.5 | 30.6 | $71.3 \times 10^{-5}$ |
| LPB2** | 181 | 48.4 | 30.7 | $60.1 \times 10^{-5}$ |
| LPB3 | 112 | 33.2 | 31.0 | $72.6 \times 10^{-5}$ |
| LPB4 | 104 | 27.8 | 32.2 | $73.2 \times 10^{-5}$ |
| LPB5 | 100 | 24.1 | 32.3 | $72.1 \times 10^{-5}$ |
| LPS | 75 | 25 | 16.9 | |
| LPBA1 | 139 | 26 | 33.1 | |
| LPBA2 | 125 | 22 | 32.9 | |

*Highly crosslinked latex
**Sparsely crosslinked latex

II—PREPARATION OF AGGLOMERATING LATICES

1) POE-PS-POE Triblock Copolymeric Surfactants

The characteristics of these surfactants are shown in Table 3, which follows:

TABLE 3

| Cop | % PS | Mn of the PS block | Mn of each POE block | Mn of the Cop. |
| --- | --- | --- | --- | --- |
| 1 | 40.5 | 2400 | 1800 | 6000 |
| 2 | 16.1 | 2400 | 6300 | 15000 |
| 3 | 21.0 | 1600 | 3000 | 7600 |
| 4 | 18.4 | 1600 | 3600 | 8800 |
| 5 | 21.0 | 1800 | 3400 | 8600 |
| 6 | 17.8 | 1800 | 4200 | 10200 |
| 7 | 9.1 | 1800 | 9000 | 19800 |

2) General Operating Procedure for Preparing these Agglomerating Latices by the Batch Process Water, the Cop surfactant and methanol are introduced into a 1-l glass reactor thermostated with a water bath at a constant temperature of 70° C.; the residual air is removed by continuous bubbling of nitrogen. The reactor is stirred at a speed which will remain constant at 250 revolutions/min. After the Cop surfactant has completely dissolved and when the temperature has reached 70° C., the mixture of monomer(s) and TDM is added. After 10 min, when the temperature has become steady again, potassium persulphate dissolved in 15 g of water is added, the addition of the persulphate marking the beginning of the reaction.

3) General Operating Procedure for Preparing These Agglomerating Latices by the Semicontinuous Process The procedure is initially as indicated in paragraph 2), except that 30% of the mixture of monomer and TDM is added and, 5 min later, all of the initiator, dissolved in water. The polymerization is then allowed to take place to 100% conversion, which results in the "seed" latex. The remaining 70% of the mixture of monomer and TDM is then added continuously at a rate of 0.3 ml/min.

4) Preparation of Various Agglomerating Latices

The above general operating procedures were followed to prepare the individual latices as shown in Table 4 below, in which the characteristics of these latices are also given.

TABLE 4

| Type of agglomerating latex | POE-PS-POE surfactant mass (g) | $K_2S_2O_8$ (g) | Monomer(s) mass (g) | Transfer agent mass (g) | MeOH mass (g) | Mean diameter (nm) | Standard deviation (nm) | Conversion (%) | Surface tension (newton/cm) |
| --- | --- | --- | --- | --- | --- | --- | --- | --- | --- |
| LPBACop1 | 4 | 0.1 | 65 | 0.4 | 60 | 197 | 43.1 | 99.8 | |
| LPBACop2 | 4 | 0.1 | 65 | 0.4 | 60 | 155 | 37.8 | 90.0 | |
| LPBACop3 | 4 | 0.1 | 65 | 0.0 | 60 | 117 | 31.2 | | |
| LPBACop4a | 4 | 0.1 | 65 | 0.4 | 60 | 135 | 32.5 | 92.5 | $45.6 \times 10^{-5}$ |
| LPBACop4b | 4 | 0.1 | 65 | 0.4 | 0 | 197 | 64.4 | 69.0 | $46.9 \times 10^{-5}$ |
| LPBACop4c | 5 | 0.1 | 65 | 0.4 | 60 | 114 | 32.4 | 99.9 | $45.1 \times 10^{-5}$ |
| LPBACop7 | 4 | 0.1 | 65 | 0.4 | 60 | 185 | 52.4 | 88.0 | $46.6 \times 10^{-5}$ |
| LPSCop4 | 4 | 0.1 | 65 | 0.4 | 60 | 186 | 44.9 | 100.0 | $47.8 \times 10^{-5}$ |
| LPBCop4 | 8 | 0.2 | 130 | 0.8 | 120 | 225 | 70.5 | 52.0 | $45.3 \times 10^{-5}$ |
| LPBCop5 | 8 | 0.2 | 130 | 0.8 | 120 | 277 | 108.0 | 70.0 | $45.7 \times 10^{-5}$ |
| LPBCop7 | 8 | 0.2 | 130 | 0.8 | 120 | 330 | 90.2 | 31.0 | $46.3 \times 10^{-5}$ |
| LPBA-SCop6 | 4 | 0.5 | 50(BA) 15(S) | 0.0 | 60 | 138 | 37.9 | | |

III—AGGLOMERATION PROCESSES

1) General Operating Procedure

Various proportions of agglomerating latices of different concentrations were added by means of a burette, with mechanical stirring, to different types of latices to be agglomerated. Unless indicated otherwise, a uniform initial mass of 30 g of latex to be agglomerated was chosen. A gentle stirring by means of a bar magnet is provided during the addition of the agglomerating latex. This stirring is continued for a few minutes after the addition of agglomerating latex, and it is then stopped.

2) Concentration Units Chosen

In the following text, R denotes the ratio of the mass of agglomerating polymer in 100 g of final latex to the mass of polymer to be agglomerated in 100 g of final latex. If it is assumed that:

$m_1$ = mass of agglomerating polymer
$m_1^L$ = mass of agglomerating latex $x_1$ = solids content of the agglomerating latex and
$m_2$ = mass of polymer to be agglomerated
$m_2^L$ = solids content of the latex to be agglomerated, then $$R = \frac{m_1}{m_2} = \frac{m_1^L x_1}{m_2^L x_2}$$

If C is the final solids content expressed in total mass of polymer in 100 g of latex, $$C = \frac{m_1 + m_2}{m_1^L + m_2^L}, \text{ with } m_1^L + m_2^L = 100$$

[Cop] is the mass of POE-PS-POE triblock copolymeric surfactant added per 100 g of latex to be agglomerated expressed as solids content. The ratio $I = D_{90}/D_{10}$ has also been defined, where $D_{90}$ and $D_{10}$ refer to the cumulative diameters forming 90% and 10% of the particle volume respectively.

3) Agglomeration of the Polybutadiene Latices by POE-PS-POE Triblock Copolymeric Acrylic Agglomerating Latices a) Influence of the Mixing Method Latex to be agglomerated: LPBA ($\phi = 104$ nm; $x_2 = 32.2\%$)

Agglomerating latex: LPBACop 4a ($\phi = 135$ nm; $x_1 = 4.52\%$)

TABLE 5

| Test | R × $10^{+2}$ | C g/100 g | (Cop) × $10^{+2}$ | Agglomerated latex Mean ∅ (nm) | Standard deviation (nm) |
|---|---|---|---|---|---|
| 1* | 0.46 | 31.30 | 0.029 | 201 | VB |
|  | 0.92 | 30.47 | 0.058 | 450 | 172 |
|  | 1.17 | 30.07 | 0.072 | 607 | VB |
|  | 1.41 | 23.68 | 0.087 | 605 | 210 |
|  | 1.84 | 28.11 | 0.116 | 490 | 149 |
|  | 2.82 | 27.58 | 0.174 | 438 | 138 |
|  | 4.23 | 25.81 | 0.241 | 390 | 115 |
| 2** | 0.87 | 30.57 | 0.053 | 402 | 142 |
|  | 0.97 | 30.40 | 0.059 | 450 | 151 |
|  | 1.09 | 30.19 | 0.067 | 542 | 181 |
|  | 1.25 | 29.92 | 0.076 | 612 | 163 |
|  | 1.46 | 29.58 | 0.089 | 573 | 157 |
|  | 1.75 | 29.12 | 0.107 | 510 | 141 |
|  | 2.19 | 28.45 | 0.134 | 449 | 116 |
|  | 2.92 | 27.42 | 0.179 | 392 | 96 |
|  | 4.38 | 25.60 | 0.268 | 386 | 110 |
|  | 8.77 | 21.54 | 0.537 | 302 | 76 |

*Agglomeration temperature: 17° C.
**Agglomeration temperature: 25° C.
VB = very large In test 1, the agglomerating latex was added to the latex to be agglomerated and, in test 2, the latex to be agglomerated was added to the agglomerating latex.

It is found that the mixing method employed to produce the agglomeration has no particular influence in this case on the diameter of the agglomerated particles.

b) Influence of Time on the Agglomeration Method
Latex to be agglomerated: LPB3 ($x_2 = 31.0\%$)
Agglomerating latex: LPBACop 3

TABLE 6

| Test | Agglomerating latex added $x_1$ (%) | R × $10^{+2}$ | Agglomerated latex Time (h) | Mean ∅ (nm) | Standard deviation (nm) |
|---|---|---|---|---|---|
| 3* | 2.4 | 0.78 | 0.06 | 195 | 73.0 |
|  |  |  | 0.13 | 204 | 73.9 |
|  |  |  | 0.25 | 209 | 78.7 |
|  |  |  | 0.50 | 212 | 83.2 |
|  |  |  | 1.5 | 215 | 81.5 |
|  |  |  | 48.0 | 216 | 85.1 |
| 4** | 4.8 | 3.13 | 0.02 | 264 | 89.3 |
|  |  |  | 0.2 | 347 | 126 |
|  |  |  | 0.4 | 382 | 99.8 |
|  |  |  | 0.5 | 372 | 124 |
|  |  |  | 0.8 | 400 | 122 |
|  |  |  | 1.0 | 446 | 163 |
|  |  |  | 1.25 | 461 | 168 |
|  |  |  | 1.75 | 476 | 170 |
|  |  |  | 2.0 | 476 | 167 |
|  |  |  | 48.0 | 493 | 173 |

*final solids content: C = 28.40
**final solids content: C = 28.61

The time $t = 0$, the beginning of the agglomeration, is taken from the end of the addition of the agglomerating latex to the polybutadiene latex.

Agglomeration of a latex of this type is fast, since, depending on the system under consideration, the final diameter is obtained after a few minutes to approximately one hour.

c) Influence of the Respective Concentrations of the Latex to be Agglomerated and of the Agglomerating Latex 1—Variation of the particle size as a function of the total concentration C at constant R
Latex to be agglomerated: LPB5
Agglomerating latex: LPBACop4a
Agglomeration temperature: 25° C.

TABLE 7

| Test | $X_1$ (%) | $X_2$ (%) | R × $10^{+2}$ | C g/100 g | Time (h) | Mean ∅ (nm) | Standard deviation (nm) | $D_{90}/D_{10}$ |
|---|---|---|---|---|---|---|---|---|
| 5 | 4.5 | 32.3 | 1.39 | 29.77 | 0.01 | 282 | 99 | 2.2 |
|  |  |  |  |  | 0.16 | 357 | 115 | 2.2 |
|  |  |  |  |  | 0.33 | 368 | 126 | 2.3 |
|  |  |  |  |  | 0.76 | 394 | 121 | 2.2 |
|  |  |  |  |  | 1.91 | 445 | 137 | 2.1 |
|  |  |  |  |  | 3.08 | 457 | 157 | 2.2 |
|  |  |  |  |  | 22.0 | 545 | 187 | 2.0 |
| 6 | 2.2 | 16.1 | 1.37 | 14.83 | 0.01 | 141 | 45 | 2.0 |
|  |  |  |  |  | 0.25 | 173 | 57 | 2.1 |
|  |  |  |  |  | 0.50 | 186 | 65 | 2.3 |
|  |  |  |  |  | 1.00 | 195 | 67 | 2.0 |
|  |  |  |  |  | 2.50 | 199 | 68 | 2.2 |
|  |  |  |  |  | 24.0 | 280 | 98 | — |
| 7 | 1.1 | 8.0 | 1.38 | 7.37 | 0.01 | 103 | 22 | 1.8 |
|  |  |  |  |  | 1.00 | 106 | 22 | 1.8 |
|  |  |  |  |  | 4.00 | 113 | 26 | 1.8 |
|  |  |  |  |  | 24.0 | 143 | 42 | — |

2—Variation in the size of the agglomerated particles as a function of R at constant C
Latex to be agglomerated: LPB3 ($x_2 = 31\%$)
Agglomerating latex: LPBACop 3
Agglomeration temperature: 17° C.

TABLE 8

| Test | $X_1$ (%) | R × $10^{-2}$ | C g/100 g | Time (h) | Mean ∅ (nm) | Standard deviation (nm) | $D_{90}/D_{10}$ |
|---|---|---|---|---|---|---|---|
| 3 | 2.4 | 0.78 | 28.39 | 0.06 | 195 | 73 | 2.3 |

TABLE 8-continued

| Test | $X_1$ (%) | $R \times 10^{+2}$ | C g/100 g | Time (h) | Mean ⌀ (nm) | Standard deviation (nm) | $\frac{D_{90}}{D_{10}}$ |
|---|---|---|---|---|---|---|---|
| | | | | 0.13 | 204 | 74 | 2.2 |
| | | | | 0.25 | 209 | 78 | 2.3 |
| | | | | 0.50 | 212 | 83 | 2.3 |
| | | | | 1.5 | 215 | 81 | 2.3 |
| | | | | 48.0 | 216 | 85 | 2.1 |
| 8 | 4.8 | 1.56 | 28.51 | 1 | 530 | 185 | — |
| | | | | 24 | 580 | 233 | — |
| 4 | 4.8 | 3.13 | 29.05 | 0.02 | 264 | 89 | 2.1 |
| | | | | 0.2 | 347 | 126 | 2.1 |
| | | | | 0.4 | 382 | 99 | 2.2 |
| | | | | 0.5 | 372 | 124 | 1.7 |
| | | | | 0.8 | 400 | 122 | 1.9 |
| | | | | 1.0 | 446 | 163 | 2.1 |
| | | | | 1.25 | 461 | 168 | 2.1 |
| | | | | 1.75 | 476 | 170 | 1.8 |
| | | | | 2.0 | 476 | 167 | 2.2 |
| | | | | 48.0 | 493 | 173 | 1.9 |

3—Variation in the size of the agglomerated particles as a function of time (R and C variable)
Latex to be agglomerated: LPB4 or LPB5
Agglomerating latex: LPBCop 4a ($x_1 = 4.5\%$)
Agglomeration temperature: 25° C.

TABLE 9

| Test | $X_2$ (%) | $R \times 10^{+2}$ | C g/100 g | Time (h) | Mean ⌀ (nm) | Standard deviation (nm) | $\frac{D_{90}}{D_{10}}$ |
|---|---|---|---|---|---|---|---|
| 5 | 32.3 (LPB5) | 1.39 | 29.77 | 0.01 | 282 | 99 | 2.2 |
| | | | | 0.16 | 357 | 115 | 2.2 |
| | | | | 0.33 | 368 | 126 | 2.3 |
| | | | | 0.76 | 394 | 121 | 2.2 |
| | | | | 1.91 | 445 | 137 | 2.1 |
| | | | | 3.08 | 457 | 157 | 2.2 |
| | | | | 22.0 | 545 | 187 | 2.0 |
| 9 | 16.1 (LPB5) | 0.69 | 15.04 | 0.01 | 175 | 104 | 2.1 |
| | | | | 0.16 | 189 | 127 | 2.0 |
| | | | | 0.33 | 192 | 118 | 2.2 |
| | | | | 1.91 | 250 | 129 | 2.2 |
| | | | | 2.50 | 270 | 110 | 2.2 |
| | | | | 24.0 | 354 | 127 | 2.1 |
| 2 | 32.2 (LPB4) | 0.87 | 30.57 | 24.0 | 402 | 142 | 1.9 |
| | | 0.97 | 30.40 | 24.0 | 450 | 151 | 2.0 |
| | | 1.09 | 30.19 | 24.0 | 542 | 181 | 2.0 |
| | | 1.25 | 29.92 | 24.0 | 612 | 163 | 2.0 |
| | | 1.46 | 29.58 | 24.0 | 573 | 157 | 1.9 |
| | | 1.75 | 29.12 | 24.0 | 510 | 141 | 1.8 |
| | | 2.19 | 28.45 | 24.0 | 449 | 116 | 1.8 |
| | | 2.92 | 27.42 | 24.0 | 392 | 96 | 1.8 |
| | | 4.38 | 25.60 | 24.0 | 386 | 110 | 1.9 |
| | | 8.77 | 21.54 | 24.0 | 302 | 76 | 2.0 |

4—Discussion

It is found that the change in the size of the agglomerated particles shows a strong dependence on the agglomeration time, on R and on C. In all cases, when C is high, the agglomeration process is fast and virtually immediate.

d) Effect of Temperature

Latex to be agglomerated: LPB3 ($x_2 = 31.0\%$)
Agglomerating latex: LPBACop3($x_1 = 4.82\%$)
$R \times 10^{10+2} = 3.10$
C (g/100 g) = 26.63

TABLE 10

| | | Agglomerated latex | |
|---|---|---|---|
| Test | T (°C.) | Time (h) | Mean ⌀ (nm) | Standard deviation (nm) |
|---|---|---|---|---|
| 10 | 65 | 0.02 | 286 | 103 |
| | | 0.18 | 303 | 102 |
| | | 0.20 | 299 | 109 |
| | | 0.50 | 298 | 105 |
| | | 1.00 | 304 | 114 |
| | | 1.50 | 329 | 121 |
| | | 2.00 | 315 | 113 |
| | | Heating stopped | | |
| 11 | | 2.25 | 448 | 153 |
| | | 2.75 | 458 | 153 |
| | | 6.00 | 491 | 147 |

It is found that the increase in agglomeration temperature results in a fairly large decrease in the diameter of the agglomerated particles. In fact, the maximum diameter reached during the agglomeration at T = 170° C. is 480 nm, whereas it is only 300 nm at T = 65° C. On the other hand, if the heating is stopped at this diameter and the agglomeration temperature is set at T = 11° C. as quickly as possible, a continued growth is observed in order to reach a final diameter of 490 nm, which is similar to the diameter obtained in an agglomeration at a low temperature (T = 17° C.).

e) Effect of the Characteristics of the Agglomerating Latices

1—Influence of the molecular mass of the POE blocks on the agglomeration of the polybutadiene latex LPB4 ($x_2 = 32.2\%$; $\phi = 104$ nm).

Agglomeration temperature: 17°0 C.
Agglomeration time: 24 h.

TABLE 11

| | Agglomerating latex | | $R \times 10^{+2}$ | C g/100 g | [Cop] $\times 10^{+2}$ | Agglomerated latex | |
|---|---|---|---|---|---|---|---|
| Test | Type | $X_1$ (%) | | | | Mean ⌀ (nm) | Standard deviation (nm) |
|---|---|---|---|---|---|---|---|
| 11 | LPBACop1 | 4.81 | 0.74 | 30.89 | 0.043 | 250 | VB |
| | | | 1.49 | 29.71 | 0.085 | 425 | 158 |
| | | | 2.48 | 28.28 | 0.143 | 556 | 187 |
| | | | 4.48 | 25.88 | 0.257 | 410 | 149 |
| 12 | LPBACop4a | 1.13 | 0.35 | 29.37 | 0.021 | 166 | 58 |
| | | | 0.70 | 27.02 | 0.042 | 219 | VB |
| | | | 1.05 | 25.04 | 0.084 | 303 | 113 |
| 13 | | 2.26 | 0.70 | 29.47 | 0.043 | 244 | VB |
| | | | 2.10 | 25.29 | 0.087 | 474 | 189 |
| 1 | | 4.52 | 0.46 | 31.30 | 0.029 | 201 | VB |
| | | | 0.92 | 30.47 | 0.058 | 450 | 172 |
| | | | 1.17 | 30.07 | 0.072 | 607 | VB |
| | | | 1.41 | 29.68 | 0.087 | 605 | 210 |
| 14 | | | 1.41 | 29.68 | 0.087 | 605 | 220 |
| | | | 1.41 | 29.68 | 0.087 | 597 | VB |
| 1 | | | 1.84 | 28.11 | 0.116 | 490 | 149 |

TABLE 11-continued

| Test | Agglomerating latex Type | X₁ (%) | R × 10⁺² | C g/100 g | [Cop] × 10⁺² | Agglomerated latex Mean ⌀ (nm) | Standard deviation (nm) |
|---|---|---|---|---|---|---|---|
| 14 | | | 2.82 | 27.58 | 0.174 | 455 | 137 |
| 1 | | | 2.82 | 27.58 | 0.174 | 438 | 138 |
| | | | 4.23 | 25.81 | 0.241 | 390 | 115 |
| 14 | | | 4.23 | 25.81 | 0.241 | 404 | 117 |
| 15 | LPBACop7 | 1.06 | 0.32 | 29.37 | 0.021 | 172 | VB |
| | | | 1.09 | 25.01 | 0.084 | 380 | VB |
| 16 | | 4.24 | 0.43 | 31.29 | 0.029 | 191 | VB |
| | | | 0.86 | 30.45 | 0.058 | 363 | |
| | | | 1.10 | 30.04 | 0.072 | 790 | |
| | | | 1.32 | 28.67 | 0.087 | 1396 | |
| | | | 2.64 | 27.54 | 0.174 | 766 | |
| | | | 3.96 | 25.74 | 0.241 | 607 | |
| 17 | LPBACop2 | 1.10 | 0.34 | 29.37 | 0.021 | 170 | VB |
| 18 | | 4.41 | 0.45 | 31.30 | 0.029 | 210 | |
| | | | 0.67 | 30.46 | 0.042 | 263 | |
| | | | 0.90 | 30.10 | 0.058 | 382 | |
| | | | 1.13 | 30.06 | 0.072 | 635 | |
| | | | 1.35 | 29.61 | 0.087 | 905 | |
| 19 | | | 1.35 | 29.61 | 0.087 | 915 | |
| 18 | | | 1.58 | 28.10 | 0.102 | 700 | |
| | | | 2.71 | 27.56 | 0.174 | 638 | |
| 19 | | | 4.06 | 25.81 | 0.241 | 481 | |

VB = very large

2—Influence of the molecular mass of the POE blocks on the polybutadiene latices LPB2 ($x_2 = 30.7\%$; $\phi = 181$ nm) and LPB1 ($x_2 = 30.6\%$; $\phi = 203$ nm)
Agglomeration temperature: 17° C.
Agglomeration time: 24 h.

TABLE 12

| Test | Polybutadiene latex | Agglomerating latex Type | X₁ (%) | ⌀ (nm) | R × 10⁺² | C (g/100 g) | [Cop] × 10⁺² | Agglomerated latex Mean ⌀ (nm) | Standard deviation |
|---|---|---|---|---|---|---|---|---|---|
| 20 | LPB2 | LPBACop4a | 1.13 | 135 | 0.37 | 28.01 | 0.022 | 450 | 161 |
| | | | | | 1.10 | 23.87 | 0.066 | 471 | 154 |
| 21 | | | 4.52 | | 0.49 | 29.85 | 0.030 | 377 | VB |
| 22 | | | | | 1.47 | 28.32 | 0.091 | 528 | 229 |
| 21 | | | | | 1.47 | | 0.091 | 492 | VB |
| 23 | | | | | 2.94 | 26.33 | 0.182 | 373 | 146 |
| 22 | | | | | 2.94 | | 0.182 | 388 | 124 |
| 23 | | | | | 4.41 | 24.65 | 0.273 | 320 | 95 |
| 22 | | | | | 4.41 | | | 337 | 55 |
| 21 | | | | | 4.4 | | | 391 | 151 |
| 24 | | LPBACop7 | 1.06 | 185 | 0.35 | 28.00 | 0.022 | 666 | VB |
| 25 | | | 4.24 | | 1.38 | 28.29 | 0.091 | | |
| | | | | | 4.14 | 24.59 | 0.273 | | |
| 26 | LPBA | LPBACop4a | 4.52 | | 1.47 | 28.22 | 0.022 | 610 | VB |
| | | | 4.52 | | 2.95 | 26.25 | 0.182 | 450 | 153 |
| | | | 4.52 | | 4.43 | 24.58 | 0.273 | 385 | VB |

3—Influence of the initial concentration of POE-PS-POE triblock copolymeric surface active agent
Latex to be agglomerated: LPB4 ($x_2 32.2\%$: $\phi = 104$ nm)
Agglomeration temperature: 17° C.
Agglomeration time: 24 h.

TABLE 13

| Test | Agglomerating latex Type | X₁ (%) | Mean ⌀ (nm) | R × 10⁺² | [Cop] × 10⁺² | Agglomerated latex Mean ⌀ (nm) | Standard deviation (nm) |
|---|---|---|---|---|---|---|---|
| 12 | LPBACop4a | 1.13 | 135 | 0.35 | 0.021 | 166 | 58 |
| | | | | 0.70 | 0.042 | 219 | VB |
| | | | | 1.05 | 0.084 | 303 | 113 |
| 1 | | 4.52 | | 0.46 | 0.029 | 201 | VB |
| | | | | 0.92 | 0.058 | 450 | 172 |
| | | | | 1.17 | 0.072 | 607 | VB |
| | | | | 1.41 | 0.087 | 605 | 210 |
| | | | | 1.84 | 0.116 | 490 | 149 |
| | | | | 2.82 | 0.174 | 455 | 137 |
| | | | | 4.23 | 0.241 | 390 | 115 |
| 27 | LPBACop4c | 1.21 | 114 | 0.75 | 0.054 | 358 | 125 |
| 28 | | 4.84 | | 0.75 | 0.054 | 268 | 101 |
| 29 | | | | 1.00 | 0.072 | 461 | VB |
| | | | | 1.25 | 0.109 | 574 | VB |

TABLE 13-continued

| | Agglomerating latex | | | | Agglomerated latex | |
|---|---|---|---|---|---|---|
| Test | Type | $X_1$ (%) | Mean ⌀ (nm) | R × $10^{+2}$ | [Cop] × $10^{+2}$ | Mean ⌀ (nm) | Standard deviation (nm) |
| 28 | | | | 1.25 | 0.109 | 544 | 193 |
| 30 | | | | 1.25 | 0.109 | 539 | 192 |
| 29 | | | | 1.75 | 0.145 | 475 | 164 |
| | | | | 2.00 | 0.182 | 470 | 142 |
| | | | | 2.50 | 0.218 | 405 | 104 |
| | | | | 3.00 | 0.255 | 394 | 136 |
| 28 | | | | 3.00 | | 415 | 130 |
| | | | | 4.51 | 0.401 | 392 | 138 |
| 29 | | | | 4.51 | | 365 | 104 |
| 28 | | | | 7.51 | 0.545 | 329 | 137 |

VB = very large

It is found that more or less extensive agglomeration is obtained depending on the type and the concentration of the POE-PS-POE triblock surfactant employed. It appears that the higher the Mn of the POE blocks, the larger the diameter of the agglomerated particles.

4—Influence of the particle size of the agglomerating latex
Agglomerating latex: LPBACop4b ($\phi$=197 nm)
Agglomeration temperature: 17° C.
Agglomeration time: 24 h.

TABLE 14

| | Polybutadiene latex | | | $X_1$ (%) | R × $10^{+2}$ | [Cop] × $10^{+2}$ | Agglomerated latex | |
|---|---|---|---|---|---|---|---|---|
| Test | Type | $X_2$ (%) | Mean ⌀ (nm) | | | | Mean ⌀ (nm) | Standard deviation (nm) |
| 31 | LPB4 | 32.2 | 104 | 1.06 | 0.32 | 0.021 | 167 | VB |
| | | | | | 0.64 | 0.041 | 247 | VB |
| | | | | | 1.09 | 0.084 | 359 | VB |
| 32 | | | | 4.24 | 1.32 | 0.087 | 644 | VB |
| | | | | | 2.64 | 0.174 | 623 | 210 |
| | | | | | 3.96 | 0.241 | 658 | 171 |
| 33 | LPB2 | 30.7 | 181 | 1.06 | 0.34 | 0.022 | 365 | 116 |
| | | | | | 1.05 | 0.066 | 461 | VB |
| 34 | | | | 4.24 | 1.41 | 0.091 | 965 | VB |
| 35 | | | | 4.24 | | 0.273 | 1634 | |

VB = very large

The sizes of the agglomerated particles obtained clearly depend on the size of the agglomerating latex particles. This effect, perceptible in the case of small-sized particles, becomes very considerable when the size of the particles to be agglomerated is large.

4—Agglomeration of the polybutadiene latex with agglomerating latices of POE-PS-POE triblock polybutadiene copolymers a) Influence of the molecular mass of the POE blocks
Latex to be agglomerated: LPB5 ($\phi$=100 nm; $x_2$=32.3%)
Agglomerating latices: LPBCop5 ($\phi$=225 nm; $x_1$=2.5%)
Agglomerating latices: LPBCop6 ($\phi$=277 nm; $x_1$=3.6%)
Agglomeration temperature: 25° C.

TABLE 15

| Test | Agglomerating latex | R × $10^{+2}$ | C (g/100 g) | [Cop] × $10^{+2}$ | Agglomerated latex | |
|---|---|---|---|---|---|---|
| | | | | | Mean ⌀ (nm) | Standard deviation (nm) |
| 36 | LPBCop5 | 0.67 | 29.92 | 0.074 | 132 (0.5) | 47 |
| | | | | | 135 (48) | 49 |
| 37 | LPBCop5 | 1.34 | 27.89 | 0.148 | 173 | 64 |
| | | | | | (0.5) 179 (48) | 66 |
| 38 | LPBCop5 | 2.58 | 24.85 | 0.285 | 214 (48) | 81 |
| 39 | LPBCop5 | 3.09 | 23.78 | 0.342 | 245 | 92 |
| 40 | LPBCop5 | 7.73 | 17.40 | 0.856 | (48) 324 | 95 |
| 41 | LPBCop5 | 10.31 | 15.27 | 1.142 | (48) 335 | 109 |
| 42 | LPBCop6 | 1.1 | 29.69 | 0.085 | (48) 216 | 79 |
| | | | | | (0.5) 227 | 83 |
| 43 | LPBCop6 | 2.2 | 27.51 | 0.171 | (48) 275 (48) | | b) Influence of the particle size of polybutadiene
Latex to be agglomerated: LPB5 ($\phi$=100 nm; $x_2$=32.3%)
Latex to be agglomerated: LPB2 ($\phi$=181 nm; $x_2$=30.7%)
Agglomerating latex: LPBCop5($\phi$225 nm; $x_1$=2.5%)
Agglomeration temperature: 25° C.

TABLE 16

| Test | Polybutatiene latex | R × $10^{+2}$ | C (g/100 g) | [Cop] × $10^{+2}$ | Agglomerated latex | |
|---|---|---|---|---|---|---|
| | | | | | Mean ⌀ (nm) | Standard deviation (nm) |
| 36 | LPB5 | 0.67 | 29.92 | 0.074 | 135 | 49 |
| 37 | | 1.34 | 27.89 | 0.148 | 179 | 66 |
| 38 | | 2.58 | 24.85 | 0.285 | 214 | 81 |

TABLE 16-continued

| Test | Polybut- atiene latex | R ×10^+2 | C (g/100 g) | [Cop] ×10^+2 | Agglomerated latex Mean φ (nm) | Standard deviation (nm) |
|---|---|---|---|---|---|---|
| 39 | | 3.09 | 23.78 | 0.342 | 245 | 92 |
| 40 | | 7.73 | 17.40 | 0.856 | 324 | 95 |
| 44 | LPB2 | 0.81 | 28.13 | 0.090 | 232 | 67 |
| 45 | | 1.63 | 26.01 | 0.180 | 240 | 35 |
| 46 | | 2.44 | 24.00 | 0.270 | 256 | 63 |
| 47 | | 3.24 | 22.64 | 0.361 | 284 | 68 |
| 48 | | 8.14 | 16.60 | 0.901 | 323 | 82 |

*Mixing method employed = addition of polybutadiene latex to the agglomerating latex.

According to the results obtained, it is found that the agglomeration employing the abovementioned latices is a function of the method of mixing the two latices (it is sometimes necessary to choose to add the latex to be agglomerated to the agglomerating latex), of the surfactant concentration, of the initial size of the polybutadiene latex and of the molecular mass of the POE blocks, and hence of the size of the agglomerating latex.

5—Agglomeration of polybutacrylate latices by POE-PS-POE triblock acrylic copolymer agglomerating latices Latex to be agglomerated: LPBA1 (φ=139 nm; $x_2$=23.1%)
Agglomerating latex: LPBACop4a (φ=135 nm; $x_1$=4.45%)
Agglomeration temperature: 25° C.

TABLE 17

| Test | R ×10^+2 | C (g/100 g) | [Cop] ×10^+2 | Agglomerated latex Mean φ (nm) | Standard deviation (nm) |
|---|---|---|---|---|---|
| 49* | 1.5 | 29.75 | 0.098 | 153 | 42 |
| | 3.5 | 26.31 | 0.230 | 177 | 34 |
| | 7.3 | 22.97 | 0.496 | 218 | 31 |
| | 8.9 | 21.79 | 0.586 | 238 | 70 |
| | 13.6 | 18.85 | 0.898 | 260 | — |
| | 22.6 | 15.22 | 1.496 | 260 | 64 |

*LPBA1 prepared in the presence of potassium laurate as a surfactant.

6—Other agglomerations a) Agglomeration of polybutadiene latices by POE-PS-POE triblock butylacrylic-styrenic copolymer agglomerating latices Latex to be agglomerated: LPB4 (100 =104 nm; $x_2$=32.2%)
Agglomerating latex: LPBA-SCop6 (φ=138 nm; $x_1$=4.68%)
Agglomeration temperature: 25° C.
Agglomeration time: 24 h.

TABLE 18

| Test | R ×10^+2 | C (g/100 g) | Cop ×10^+2 | Agglomerated latex Mean φ (nm) | Standard deviation (nm) |
|---|---|---|---|---|---|
| 50 | 1.48 | 31.31 | 0.028 | 191 | VB |
| | 0.97 | 30.48 | 0.057 | 437 | 147 |
| | 1.45 | 29.69 | 0.085 | 496 | 173 |
| | 1.94 | 28.96 | 0.114 | 484 | 170 |
| | 2.90 | 27.61 | 0.172 | 438 | 142 |
| | 4.36 | 25.85 | 0.256 | 376 | 131 | b) Agglomeration of poly(butyl acrylate) latices by the POE-PS-POE block butadiene copolymer agglomerating latices Latex to be agglomerated: LPBA1 (φ=139 nm; $x_2$=33.1%) or LPBA2 (φ=125 nm; $x_2$=32.9%)
Agglomerating latex: LPBCop5 (φ=225 nm; $x_1$=2.5%)
Agglomeration temperature: 25° C.
Agglomeration time: 48 hr.

TABLE 19

| Test | Latex to be Agglomerated | R ×10^+2 | C (g/100 g) | Agglomerated latex Mean φ (nm) | Standard deviation (nm) |
|---|---|---|---|---|---|
| 51 | LPBA1* | 0.84 | 30.04 | 330 | 119 |
| 52 | LPBA2** | 0.75 | 30.13 | 329 | VB |

*LPBA1: surfactant: potassium laurate
**LPBA2: surfactant: SDS
VB = very large c) Various agglomerations

TABLE 20

| Test | Latex to be agglomerated | Agglomerating latex | R ×10^+2 | C (g/100 g) | Agglomerated latex Mean φ (nm) | Standard deviation (nm) |
|---|---|---|---|---|---|---|
| 53 | LPS | LPBCop5 | 4.9 | 4.8 | 358 | — |
| 54 | LPB* | LPSCop4 + SDS | 3.2 | 26.28 | 190 | 70 |
| | | | 6.5 | 24.85 | 223 | 82 |
| | | | 9.6 | 23.63 | 350 | 131 |
| 55 | LPS** | LPBACop4a + SDS | 0.9 | 30.1 | 181 | VB |
| | | | 5.5 | 27.1 | 288 | VB |
| | | | 8.2 | 25.7 | 390 | 131 |
| | | | 13.7 | 23.4 | 280 | 89 |

*LPB (φ = 84.5 nm; $x_1$ = 28.0%)
**LPS (φ = 83.5 nm; $x_1$ = 30.9%)
VB = very large The present invention will be illustrated further by the following examples:

Two POE-PS-POE triblock polymers whose characteristics are shown in Table 21 below were used to prepare the agglomerating latices employed:

TABLE 21

| Cop | M of Cop* | M of each POE block | % PS** |
|---|---|---|---|
| 8 | 77 000 | 15 000 | 20 |
| 9 | 25 000 | 4 000 | 33.3 |

*determined by gel permeation chromatography:
**determined by the UV method based on the fact that ethylene oxide does not absorb at a wavelength of 258 nm, only the PS block being detectable.

A series of LPBACop agglomerating latices were prepared according to the following general operating procedure:

"Into a 2-1 reactor are introduced: water, methanol if desired, in weight percentages shown in Table 22 below, 23% by weight of butyl acrylate together with, based on the monomer, 6% by weight of triblock polymer and 0.6% by weight ob TDM. The reactor is heated up to 70° C., at a stirring speed of 250 revolutions/min. When the temperature reaches 70° C., 0.15% by weight of $K_2S_2O_8$, based on the monomer, is added. The synthesis time is set at 4 hours."

The above operating procedure was followed in order to prepare these various LPBACop latices, as shown in Table 22 below, in which the characteristics of these latices are also given.

Also shown in this table are the characteristics of a polystyrene latex prepared batchwise in a 2-1 reactor, the ingredients (91% by weight of water+cop 8, 9% by weight of styrene and 1% by weight of TDM) being charged into the reactor and heated to 90° C. at a stirring speed of 200 revolutions/min, potassium persulphate then being added and the synthesis time being at least 3 hours.

TABLE 22

| Type of agglomerating latex | % of water | % of methanol | Mean φ (nm) | $x_1$ (%) |
|---|---|---|---|---|
| LPBACop 8a | 77 | 0 | 340 | 23 |
| LPBACop 8b | 67 | 10 | 200 | 22.5 |
| LPBACop 8c |  |  | 320 | 23 |
| LPBACop 9a | 55 | 22 | 130 | 19 |
| LPBACop 9b | 67 | 10 | 220 | 23 |
| LPSCop 8 | 91 | 25 | 160 | 25 |

The characteristics of the latices to be agglomerated employed in this series of examples are shown in Table 23 below.

TABLE 23

| Type of latex to be agglomerated | Mean φ (nm) | $X_2$ (%) | pH |
|---|---|---|---|
| LPB6* | 100 | 30 | 10 |
| LPB7 | 110 | 30 | 12 |
| LPB8 | 150 | 30 | 12 |
| LPBA3** | 60 | 31 | 4.5 |
| LPBA4** | 75 | 28 | 4.5 |
| LSBR | 230 | 40 | 11 |

*latex containing $10^{-2}$ mole of SDS per 100 g of latex.
**synthesized with SDS as a surfactant.

In order to produce the agglomeration, the agglomerating latex is added batchwise to the latex to be agglomerated, to which the SDS surfactant has been added where appropriate, with mechanical stirring. The temperature, the agglomeration time and all of the parameters affecting the development of the size of the agglomerated particles (measured by turbidimetry) have been studied.

a) Influence of the agglomeration time
Latex to be agglomerated: LPB6
Agglomerating latex: LPBA Cop 9a
Operating conditions: temperature: 20° C.; $R=2\times10^{-2}$

TABLE 24

| Test | Time (h) | Agglomerated latex Mean φ (nm) |
|---|---|---|
| 56 | 0.5 | 280 |
|  | 2 | 470 |
|  | 6 | 840 |
|  | 12 | 1010 |
|  | 24 | 1010 |

After 12 hours' agglomeration the particle size is stable.

b) Influence of the respective concentrations of the latex to be agglomerated and the agglomerating latex 1—Variation of the size of agglomerated particles as a function of the total concentration C at constant R
Latex to be agglomerated: LPB8
Agglomerating latex: LPBACop8a
Operating conditions: temperature: 20° C.; $R=2\times10^{-2}$, pH=12.

TABLE 25

| Test | C g/100 g | Time (h) | Agglomerated latex Mean φ (nm) |
|---|---|---|---|
| 58 | 30 | 1 | 300 |
|  |  | 24 | 430 |
| 59 | 50 | 1 | 660 |
|  |  | 24 | 1000 |

2—Variation in the size of agglomerated particles as a function of R at constant C.
Latex to be agglomerated: LPB8
Agglomerating latex: LPBACop8a
Operating conditions:
  temperature: 20° C;
  time: 24 hours; pH=12

TABLE 26

| Test | $R \times 10^{-2}$ | C g/100 g | Agglomerated latex Mean φ (nm) |
|---|---|---|---|
| 58 | 1 | 30 | 430 |
| 60 | 2 | " | 660 |
| 61 | 3 | " | 700 |
| 62 | 5 | " | 580 |
| 63 | 8 | " | 580 |
| 64 | 0.5 | 50 | 820 |
| 59 | 1 | " | >1000 |
| 65 | 2 | " | 660 |
| 66 | 3 | " | 580 | c) Influence of the characteristics of the agglomerating latices.

1—Influence of the particle size
Latex to be agglomerated: LPB8
Operating conditions:
  temperature: 20° C.;
  time: 24 hours; pH=8

TABLE 27

| Test | Agglomerating latex | $R \times 10^2$ | Mean φ (nm) |
|---|---|---|---|
| 67 | LPBACop8b | 1 | 600 |
| 68 | " | 2 | 620 |
| 69 | " | 3 | 600 |
| 70 | " | 5 | 550 |
| 71* | " | 7 | 480 |
| 72* | LPBACop8a | 1 | 640 |
| 73* | " | 2 | >1000 |
| 74* | " | 3 | 960 |
| 75* | " | 5 | 780 |

2—Influence of the molecular mass of the POE blocks in the POE-PS-POE triblock polymers
Latex to be agglomerated: LPB8+1.5 $10_{-4}$ mole of SDS/100 g of latex
Operating conditions:
  temperature: 20° C.;
  time 24 hours

TABLE 28

| Test | Agglomerating latex | $R \times 10^2$ | Mean φ (nm) |
|---|---|---|---|
| 76 | LPBACop9b | 1 | 450 |
| 77 | " | 2 | 450 |

TABLE 28-continued

| Test | Agglomerating latex | R × 10² | Mean φ (nm) |
|---|---|---|---|
| 78 | " | 3 | 500 |
| 72 | LPBACop8a | 1 | 640 |
| 73 | " | 2 | >1000 |
| 74 | " | 3 | 960 |
| 75 | LPBACop9b | 5 | 780 |
| 79 | " | 5 | 700 |
| 80 | " | 7 | 480 | d) Influence of the characteristics of the latices to be agglomerated

1—Influence of the pH of the polybutadiene latices
Latex to be agglomerated: LPB8
Agglomerating latex: LPBACop8a
Operating conditions:
  temperature: 20° C.
  time: 24 hours

TABLE 29

| Test | pH | R × 10² | C g/100 g | SDS mole 10⁴ | Agglomerated latex Mean φ (nm) |
|---|---|---|---|---|---|
| 64 | 12 | 0.5 | 50 | 0 | 820 |
| 59 |  | 1 | " | " | >1000 |
| 65 |  | 2 | " | " | 660 |
| 66 |  | 3 | " | " | 580 |
| 63 |  | 8 | " | " | 580 |
| 81 | 8* | 1 | " | 1.5 | 600 |
| 82 |  | 2 | " | " | 620 |
| 83 |  | 3 | " | " | 700 |
| 84 |  | 5 | " | " | 1000 |
| 85 |  | 7 | " | " | 820 |
| 58 | 12 | 1 | 30 | " | 430 |
| 60 |  | 2 | " | " | 660 |
| 61 |  | 3 | " | " | 700 |
| 62 |  | 5 | " | " | 580 |
| 63 |  | 8 | " | " | 640 |
| 72 | 8* | 1 | " | " | 640 |
| 73 |  | 2 | " | " | >1000 |
| 74 |  | 3 | " | " | 960 |
| 75 |  | 5 | " | " | 780 |

*pH of the latex to be agglomerated adjusted to 8 by the addition of a dilute solution of hydrochloric acid.

2—Influence of the degree of covering of the latex to be agglomerated
Agglomerating latex: LPBCop8a
Operating conditions:
  temperature: 20°0 C.;
  time: 24 hours

TABLE 30

| Test | Latex to be agglomerated | Degree of covering % | R × 10² | Agglomerated latex Mean φ (nm) |
|---|---|---|---|---|
| 57 | LPB7 | >100 | 2 | 420 |
| 58 | LPB8 | 80–85 | 1 | 430 |
| 60 | " |  | 2 | 660 |
| 61 | " |  | 3 | 700 |
| 62 | " |  | 5 | 580 |
| 63 | " |  | 8 | 580 |

The agglomeration is more pronounced in the case of the latex which has a lower degree of covering.

e) Other agglomerations
Operating conditions:
  temperature: 20° C.
  time: 24 hours

TABLE 31

| Test | Agglomerating latex | Latex to be agglomerated | R × 10² | Agglomerated latex Mean φ (nm) |
|---|---|---|---|---|
| 86 | LPSCop 8 | LPB8 | 1 | 430 |
| 87 | " | " | 2 | 450 |
| 88 | " | " | 3 | 700 |
| 89 | " | " | 5 | 550 |
| 90 | " | " | 7 | 460 |
| 91 | LPBACop8c | LPBA3 | 1 | 185 |
| 92 | " | " | 3 | 200 |
| 93 | " | " | 5 | 420 |
| 94 | " | " | 7 | 550 |
| 95 | " | " | 10 | 840 |
| 96 | " | " | 15 | 800 |
| 97 | " | " | 20 | 545 |
| 98* | LPSCop8 | LPBA4 | 1 | 230 |
| 99* | " | " | 3 | 550 |
| 100 | LPBACop8c | LSBR | ≧0.5 | >1 μm |

*Addition of 10⁻⁴ mole of SDS per 100 g of latex to the latex to be agglomerated.

We claim:

1. An agglomerated latex produced by a process comprising mixing the latex to be agglomerated with an agglomerating latex,
   wherein said latex to be agglomerated is a polymer selected from the group consisting of elastomers and thermoplastic resins,
   wherein said agglomerating latex consists of:
     (a) a polymer (A) selected from the group consisting of elastomers and thermoplastic resins; and
     (b) a nonionic surface-active agent (B) which is a block polymer comprising at least one polyoxyethylene block and at least one block of a polymer selected from the group consisting of vinyl, diene and acrylic and methacrylic ester polymers, and
   wherein said agglomerating latex is produced by employing said nonionic surface-active agent (B) during the synthesis of polymer (A).

2. An agglomerated latex according to claim 1, wherein the polymer of said latex to be agglomerated and said polymer (A), which are the same or different, are selected from the group consisting of homopolymers and copolymers of butadiene, isoprene, styrene, alphamethylstyrene, vinyltoluenes, acrylonitrile and alkyl esters of acrylic, methacrylic, maleic, fumaric, crotonic and itaconic acids in which the alkyl group contains from 1 to 12 carbon atoms.

3. An agglomerated latex according to claim 1, wherein said latex to be agglomerated is a SBR latice or a multilayer acrylic latice.

4. An agglomerated latex according to claim 1, wherein said nonionic surface-active agent is a triblock polymer.

5. An agglomerated latex according to claim 4, wherein said nonionic surface-active agent is a triblock polymer containing two terminal polyoxyethylene blocks.

6. An agglomerated latex according to claim 1 wherein said nonionic surface-active agent is a block polymer consisting of at least one polyoxyethylene block and at least one polystyrene block.

7. An agglomerated latex according to any one of claims 1 to 6, wherein said nonionic surface-active agent has a number average molecular mass of between 1000 and 1,000,000.

8. An agglomerated latex according to any one of claims 1 to 6, wherein said nonionic surface-active agent is from 5% to 95% by weight polyoxyethylene.

9. An agglomerated latex according to claim 1, wherein said latex to be agglomerated is prepared by emulsion polymerization in the presence of an anionic surface-active agent.

10. An agglomerated latex according to claim 9, wherein the polymer particles making up said latex to be agglomerated are between 50 and 300 nm in diameter and the solids content of said latex to be agglomerated is between 5% and 50% by weight.

11. An agglomerated latex according to claim 1, wherein the polymer particles of (A) making up said agglomerating latex are between 60 and 500 nm in diameter and the solids content of polymer (A) is between 1% and 40% by weight.

12. An agglomerated latex according to claim 1, wherein said mixing is carried out for a period of time between one minute and 48 hours.

13. An agglomerated latex according to claim 1, wherein said mixing is carried out at a temperature of between 10°0 C. and 100° C.

14. A method of improving the impact resistance of a thermoplastic matrix, comprising dispersing in said thermoplastic matrix an agglomerated latex as claimed in claim 1.

15. A method of improving the impact resistance of a thermoplastic matrix as claimed in claim 14, wherein said thermoplastic matrix comprises (1) at least one polymer of at least one monomer chosen from alkyl methacrylates in which the alkyl group contains from 1 to 4 carbon atoms, styrene, substituted styrenes, acrylonitrile and methacrylonitrile, or (2) at least one polymer having more than 50% by weight of at least one of the monomers of (1) and at least one other ethylenically monounsaturated copolymerizable monomer.

16. A rigid thermoplastic matrix having dispersed therein an agglomerated latex according to claim 1.

17. A rigid thermoplastic matrix according to claim 16, wherein said thermoplastic matrix comprises (1) at least one polymer of at least one monomer chosen from alkyl methacrylates in which the alkyl group contains from 1 to 4 carbon atoms, styrene, substituted styrenes, acrylonitrile and methacrylonitrile, or (2) at least one polymer having more than 50% by weight of at least one of the monomers of (1) and at least one other ethylenically monounsaturated copolymerizable monomer.

* * * * *

UNITED STATES PATENT AND TRADEMARK OFFICE
CERTIFICATE OF CORRECTION

PATENT NO. : 5,262,455
DATED : November 16, 1993
INVENTOR(S) : Gerard RIESS et al.

It is certified that error appears in the above-indentified patent and that said Letters Patent is hereby corrected as shown below:

Claim 1, Col. 22, line 33 after "Vinyl" insert --polymers--;
Claim 1, Col. 22, line 34 after "diene" insert --polymers--, after "acrylic" insert --ester polymers--.
Claim 13, Col. 23, line 21 after "10°" delete --0--.

Signed and Sealed this

Twenty-fourth Day of May, 1994

Attest:

BRUCE LEHMAN

Attesting Officer    Commissioner of Patents and Trademarks